United States Patent
Pfosi et al.

(10) Patent No.: US 11,552,848 B2
(45) Date of Patent: Jan. 10, 2023

(54) SYSTEM AND METHOD FOR MANAGING A NETWORK DEVICE

(71) Applicant: Arista Networks, Inc., Santa Clara, CA (US)

(72) Inventors: Joshua Pfosi, Nashua, NH (US); Margaret Joan Zielinski, Brookline, NH (US); Richard William Bradford, Nashua, NH (US)

(73) Assignee: Arista Networks, Inc., Santa Clara, CA (US)

( * ) Notice: Subject to any disclaimer, the term of this patent is extended or adjusted under 35 U.S.C. 154(b) by 170 days.

(21) Appl. No.: 16/847,556

(22) Filed: Apr. 13, 2020

(65) Prior Publication Data

US 2021/0320842 A1    Oct. 14, 2021

(51) Int. Cl.
| | |
|---|---|
| *H04L 41/0816* | (2022.01) |
| *H04L 69/325* | (2022.01) |
| *H04L 9/40* | (2022.01) |
| *H04L 47/12* | (2022.01) |
| *H04L 69/04* | (2022.01) |
| *H04L 47/20* | (2022.01) |

(52) U.S. Cl.
CPC ......... *H04L 41/0816* (2013.01); *H04L 47/12* (2013.01); *H04L 47/20* (2013.01); *H04L 63/1458* (2013.01); *H04L 69/04* (2013.01); *H04L 69/325* (2013.01)

(58) Field of Classification Search
None
See application file for complete search history.

(56) References Cited

U.S. PATENT DOCUMENTS

| | | | |
|---|---|---|---|
| 10,291,473 B2* | 5/2019 | Joshi | H04L 41/0893 |
| 10,742,501 B1* | 8/2020 | Pianigiani | H04L 41/082 |
| 11,258,635 B2* | 2/2022 | Han | H04L 12/66 |
| 2008/0013551 A1* | 1/2008 | Scholl | H04L 45/54 370/426 |
| 2009/0161549 A1* | 6/2009 | Qian | H04L 45/28 370/242 |
| 2010/0131799 A1* | 5/2010 | Wu | H04L 41/145 714/E11.212 |
| 2012/0263049 A1* | 10/2012 | Venkatachalapathy | H04L 41/12 370/252 |
| 2018/0262454 A1* | 9/2018 | Zandi | H04L 51/214 |
| 2021/0036887 A1* | 2/2021 | Meng | H04L 12/66 |
| 2021/0306261 A1* | 9/2021 | Duan | H04L 45/02 |
| 2022/0060277 A1* | 2/2022 | Wei | H04W 88/14 |

* cited by examiner

*Primary Examiner* — Otis L Thompson, Jr.
(74) *Attorney, Agent, or Firm* — Sprinkle IP Law Group (57) ABSTRACT

In general, embodiments described herein relate to methods and systems for automating the configuration of network devices. More specifically, embodiments of the invention relate to using configuration commands that specify protocol-specified relationships in order to generate granular (or specific) filtering rules (also referred to as rules). The rules are subsequently programmed into the network device.

19 Claims, 3 Drawing Sheets

SYSTEM AND METHOD FOR MANAGING A NETWORK DEVICE

BACKGROUND

Network device configuration is a complex process. The complexity is the result of the network device having to support many different protocols and to send and receive network traffic from a large number of other network devices. Further, the networks in which the network devices are located are not statically configured. Rather, the configuration of the network may vary overtime. As a result, network administrators must routinely update the configuration of the network devices to address the changes in the network configuration. The traditional approach to configuring (or updating the configuration of) the network devices is a manual, time consuming, and error prone process. As a result, it is common for network devices to be misconfigured. This misconfiguration may, for example, expose the network devices (and, more broadly, the network) to malicious activity—e.g., distributed denial of service (DDOS) attacks and result in sub-optimal performance of the network.

For example, scenarios exist in which network devices in a network can be overwhelmed by a DDOS attack. The DDOS attack may be orchestrated by one or more of the malicious (or compromised) devices ("attacking devices") within or connecting to the network. The DDOS attacks generally take the form of hundreds, or thousands, of attacking devices sending network traffic to the network devices in the network. These attacking devices can aggregate an amount of network traffic that is large enough to overwhelm the network devices' ability to process legitimate network traffic. If the network devices are misconfigured, they can become overwhelmed and the overall operation of the network is negatively impacted.

SUMMARY

In general, in one aspect, the invention relates to a method for reducing overhead in configuring a network device that is operatively coupled for communication to a plurality of other network devices, wherein the network device and the plurality of other network devices all execute a protocol, the method comprising: obtaining, by the network device, a configuration command comprising a protocol-specified relationship defined by the protocol, wherein the protocol-specified relationship defines a relationship between the network device and at least one of the other plurality of network devices; obtaining, using the protocol-specified relationship, network device information from a data repository on the network device; obtaining a rules template associated with the protocol-specified relationship; generating, by the network device, a plurality of rules based on the rules template and on the network device information; and programming the network device using the plurality of rules.

In general, in one aspect, the invention relates to a network device operatively coupled for communication to a plurality of other network devices, wherein the network device and the plurality of other network devices all execute a protocol, the network device comprising: a processor; a data repository comprising network device information; a hardware component; and a rule generator, which when executed by the processor, is configured to: obtain a configuration command comprising a protocol-specified relationship defined by the protocol, wherein the protocol-specified relationship defines a relationship between the network device and at least one of the other plurality of network devices; obtain, using the protocol-specified relationship, the network device information from the data repository; obtain a rules template associated with the protocol-specified relationship; generate a plurality of rules based on the rules template and on the network device information; and program the hardware component using the plurality of rules.

In general, in one aspect, the invention relates to a method for managing a network device, comprising: obtaining a configuration command comprising a protocol-specified relationship; obtaining, using the protocol-specified relationship, network device information; generating a plurality of rules based, at least in part, on the network device information; and programming the network device using the plurality of rules.

BRIEF DESCRIPTION OF DRAWINGS

Certain embodiments will be described with reference to the accompanying drawings. However, the accompanying drawings illustrate only certain aspects or implementations of the embodiments by way of example and are not meant to limit the scope of the claims.

DETAILED DESCRIPTION

In general, embodiments described herein relate to methods and systems for automating the configuration of network devices. More specifically, embodiments of the invention relate to using configuration commands that specify protocol-specified relationships in order to generate granular (or specific) filtering rules (also referred to as rules). The rules are subsequently programmed into the network device. For example, the configuration command may specify protocol-specific network traffic data units (NTDUs) (defined below) (e.g., NTDUs generated in accordance with Border Gateway Protocol (BGP)) and/or protocol-specified relationships (e.g., "BGP neighbors") instead of specifying specific source and/or destination L2/L3/L4 addresses/information (e.g., IP addresses, IP prefixes, port numbers, etc.). The use of such configuration commands may enable network administrators (or other users) to more readily program network devices without requiring any specific details related to the source and/or destination of the NTDUs. Moreover, one or more embodiments of the invention provide an auto-update mechanism that is able to receive updates of the protocol-specified relationships and then propagate these updates into an updated set of rules.

As discussed above, once the rules are generated, they are programmed into the network device. The programming may include, but is not limited to, programming hardware components of the network device (e.g., a ternary content-addressable memory (TCAM)). In certain scenarios, the generated rules may be compressed to obtain a smaller set of packet rules. In this context, the compression may include removing duplicative rules. For example, if the configuration command specifies a traffic policy (also referred to as a rule(s) or programmed rule(s)) that is to be applied to all virtual routing functions (VRFs) in the network device, then there is a high likelihood that there will be duplicative packet rules. In this scenario, the duplicative rules may be identified and removed prior to programming the hardware components. The compression enables better usage of the limited space of the hardware components in the network device.

By specifying configuration commands to apply to NTDUs associated with a protocol or to apply to NTDU received from other network devices based on a protocol-specified relationship, embodiments of the invention enable more efficient and less error prone programming of network devices. Moreover, by specifying protocols and/or protocol-specified relationships, the network devices may be readily configured to permit and/or block NTDUs associated with specific protocols. This enables a more effective and less error prone mechanism to protect the network devices, e.g., from DDOS attacks or other types of malicious activity.

For example, in order for network devices to process NTDUs, the network devices rely on a large number of network management protocols (e.g., Open Shortest Path First (OSPF), Protocol Independent Multicast (PIM), Internet Group Management Protocol (IGMP), BGP, Bi-directional Forwarding Detection (BFD), Multihop BFD, etc.) to correctly process (e.g., forward and/or drop) NTDUs). The network devices communicate information with each other using NTDU associated with the aforementioned network management protocols. NTDUs that are being transmitted across a network (e.g., a NTDU being transmitted from Server A to Server B) via the network devices in the network are typically only processed by the hardware components of the network device (e.g., the switching hardware, etc.) and are not processed by the processor (e.g., a central processing unit (CPU) of the network devices. However, NTDUs associated with network management protocols are processed by the processor in the network device. As a result, one mechanism to disrupt the operation of a network device is to flood the network device with NTDUs associated with management protocols. This results in the processor of the network device being overwhelmed, which in turn degrades the operation of the network device.

To mitigate the above issue, embodiments of the invention enable the configuration of rules by specifying specific management protocols and/or specific protocol-specified relationships. In this manner, network administrators can readily filter out or permit NTDUs associated with management protocols using rules implemented in the hardware components. By performing the aforementioned filtering in the hardware components, the processor is protected from having to process malicious NTDUs.

In another embodiment of the invention, the aforementioned rules may also be used to enforce fair use of the CPU of the network device to process NTDUs from non-malicious network devices, e.g., BGP neighbors that are configured by the administrator of the network device.

Figure 1:
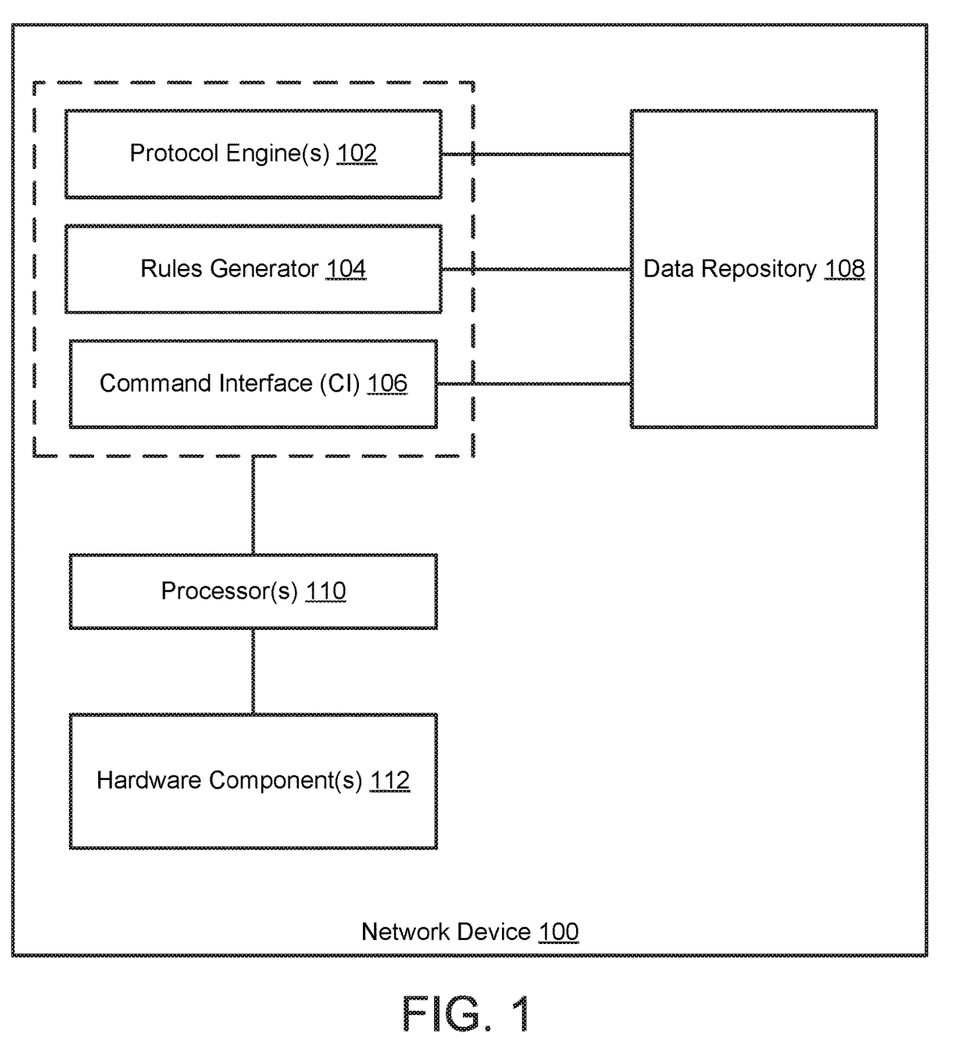
FIG. 1 shows a diagram of an example system in accordance with one or more embodiments disclosed herein.

FIG. 1 shows a network device in accordance with one or more embodiments described herein. As shown in FIG. 1, the network device (100) includes one or more protocol engines (102), a rule generator (104), a command interface (CI) (106), a data repository (108), one or more processors (110), and one or more hardware components (112). Each of these components is described below.

In one or more embodiments, a network device (100) is a physical device that includes and/or is operatively connected to persistent storage (not shown), memory (e.g., random access memory (RAM)) (not shown), one or more processor(s) (e.g., integrated circuits) (110), and at least one physical network interface (not shown), which may also be referred to as a port. Examples of a network device (100) include, but are not limited to, a network switch, a router, a multilayer switch, a fiber channel device, an InfiniBand® device, etc. A network device (100) is not limited to the aforementioned specific examples.

In one or more embodiments, a network device (100) includes functionality to receive NTDUs (e.g., frames, packets, tunneling protocol frames, etc.) at any of the physical network interfaces (i.e., ports) of the network device (100) and to process the NTDUs. The NTDU may correspond to NTDUs that are destined for the network device (i.e., the network device is the intended destination of the NTDU) or NTDUs that are destined for other devices operatively connected to the network device, where the network device is the next hop in the path towards the NTDUs ultimate destination. The NTDUs that are destined for the network device may include NTDUs that are generated by other network devices and based on a specific network management protocols. Such NTDUs may be referred to as management NTDUs.

In one or more embodiments, processing a NTDU includes, but is not limited to, using a series of one or more table lookups (e.g., longest prefix match (LPM) lookups, traffic policy rule lookup, etc.) and corresponding actions (e.g., forward from a certain egress port, add a labeling protocol header, rewrite a destination address, encapsulate, drop, log, count, police, forward to protocol engine of network device for additional processing, etc.). Such a series of lookups and corresponding actions may be referred to as a pipeline. Examples of pipeline processing include, but are not limited to, performing a lookup to determine (i) whether to take a security action (e.g., drop the NTDU); (ii) whether to mirror the NTDU; (iii) how to route/forward the NTDU in order to transmit the NTDU from a physical network interface of the network device (100) towards another device (which may be another network device); and/or (iv) whether to forward (or otherwise provide the NTDU (which may be a management NTDU) to a protocol engine (102) for additional processing. One or more actions to be taken with regards to a received NTDU may be obtained by a network device based on a traffic policy specified in the configuration command (described below, e.g., in FIG. 2)

In one or more embodiments, a network device also includes and/or is operatively connected to device storage (i.e., non-transitory computer readable mediums) (not shown) and/or device memory (not shown) storing software and/or firmware.

Such software and/or firmware may include instructions which, when executed by the one or more processors (110) of a network device (100), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the network device (100) is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (100)) that facilitate network connectivity for one or more operatively connected devices (e.g., computing devices, data storage devices, other network devices, etc.) (not shown). In one or more embodiments, the network device (100) and other devices within the network (not shown) are arranged in a network topology (not shown). In one or more embodiments, a network topology is an arrangement of various elements of a network.

In one or more embodiments, a computing device is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

In one or more embodiments, CI (106) provides an interface between other components in the network device (100) (e.g., the rule generator (104) and the protocol engine(s) (102)) and one or more users (or other devices). The CI (106) may provide (or present) a command line interface or graphical user interface (GUI) to a user (e.g., an administrator), which enables the user to provide configuration commands. The CI (106) may also include functionality to receive configuration commands from other devices (e.g., another network device, a computing device, etc.).

The CI (106) upon receipt of the configuration command(s) may analyze the configuration command and, based on the analysis, provide the configuration command(s) to the appropriate component(s) in the network device. In another embodiment of the invention, the CI (106) may only confirm whether the configuration command is syntactically correct and, if the configuration command is syntactically correct, (i) store the configuration command in the data repository (108) or (ii) notify the other components in the network device that a configuration command is received. In the former scenario, the storage of the configuration command in the data repository may trigger one or more notifications to other components in the network device, which may then each analyze the configuration command and then take appropriate action (which may be to perform an action or take no action with respect to the configuration command) In the latter scenario, each of the other components in the network device (or a subset thereof) may receive the configuration command Upon receipt, they may each analyze the configuration command and then take appropriate action (which may be to perform an action or take no action with respect to the configuration command)

In one or more embodiments, the protocol engine(s) (102) includes functionality to implement one or more network management protocols. As discussed above, the network device (100) implements a number of network management protocols (e.g., OSPF, PIM, IGMP, BGP, BFD, Multihop BFD, etc.) to correctly process NTDUs. The protocol engine(s) include functionality to implement the network management protocols via (i) processing configuration commands directed to the network management protocols and (ii) processing management NTDUs received by the network device. The result of the processing may be to update network device information in the data repository.

For example, consider a scenario in which the protocol engine is configured to implement BGP. In this scenario, the protocol engine may receive configuration commands from the CI related to configuration of BGP on the network device and implement such configuration. The implementation may include storing certain configuration information (which is part of the network device information) in the data repository related to BGP and programming one or more routes into one or more hardware components (described below). Further, the implementation may include receiving a default BGP route advertisement (e.g., a management NTDU) and then processing the default BGP route advertisement in accordance with the BGP. The result of the processing may be to update the network device information related to BGP in the data repository. The invention is not limited to the aforementioned examples.

The network device (100) may include any number of protocol engine(s) (102). Further, each protocol engine may implement (or otherwise support) multiple network management protocols without departing from the invention.

In one or more embodiments, the rule generator (104) includes functionality to generate one or more rules using protocol-specified relationships. A protocol-specified relationship is a relationship between the network device and another network device that is determined using a network management protocol. Said another way, the protocol-specified relationship is defined (or specified) in the network management protocol. For example, BGP includes a protocol-specified relationship of "neighbor". Within the BGP protocol, a "neighbor" of a network device in BGP is a second network device with which the network device is configured to establish a Transmission Control Protocol (TCP) session on port 179. In this example, the protocol-specified relationship is "neighbor". The invention is not limited to the aforementioned example, e.g., BGP sessions may be established on ports other than port 179.

The rule generator is configured to generate rules based on the protocol-specified relationship in accordance with FIG. 2 (discussed below). Further, the rule generator is configured to initiate programming of the generated rules in to the hardware component(s) in accordance with FIG. 2. In addition, the rule generator is configured to update the rules that are programmed into the hardware components in accordance with FIG. 3 (discussed below). The updating of the rules (which may include adding and/or removing rules) programmed into the hardware component(s) may be performed in an automated manner after the initial set of rules is generated based on a configuration command (discussed below in FIG. 3).

The protocol engine(s) (102), the rule generator (104), and the CI (106) may be implemented using software and/or firmware. Such software and/or firmware may include instructions which, when executed by the one or more processors (110) of a network device (100), cause the one or more processors to perform operations in accordance with one or more embodiments described herein. The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, the data repository (108) is operatively connected to the protocol engine(s) (102), the rule generator (104), and CI (106). In one or more embodiments, a data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments, the protocol engine(s) (102), the rule generator (104), and CI (106) each include functionality to store data that may be used by any of the other components in the network device (100) to perform one or more embodiments of the invention.

In one or more embodiments, a hardware component(s) (112) is any hardware (e.g., circuitry such as, for example, application specific integrated circuits (ASICs)), which may include and/or be programmed by/with software and/or firmware, that includes functionality related to receiving, processing, and/or transmitting NTDUs in accordance with one or more embodiments described herein. In one or more embodiments, a hardware component (108) is a NTDU processor (e.g., a network chip), a field programmable gate array (FPGA), and/or any other component into which the generated rules may be programmed. In one or more embodiments, the network device (100) includes any number of hardware components (112) (e.g., network chips, field programmable gate arrays (FPGAs), etc.).

In order to perform the aforementioned functionality, a hardware component may include any number of subcomponents (not shown). Such subcomponents may include, but are not limited to, one or more processors, one or more buffers, any type or amount of storage of any type for storing hardware tables (e.g.). Such tables may control, at least in part, various aspects of the operation of a network device (100), such as functionality related to NTDU processing. Examples of storage for hardware tables may include, but are not limited to, tertiary content addressable memory (TCAM) and static random access memory (SRAM). A hardware component may also include and/or be operatively connected to any number of physical network interfaces of a network device (100). Such interfaces may provide a path external to the network device (e.g., to other devices), and/or may be operatively connected to other components internal to the network device (100), and each such interface may be an ingress and/or egress interface. In one or more embodiments, a hardware component (112) may one or more rules generated by the rule generator (see e.g., FIGS. 2 and 3).

As a non-limiting example, a hardware component may be and/or may include an ASIC that receives NTDUs at an ingress port and determines that the NTDU is to be forwarded (or otherwise provided), based on matching a rule in a TCAM, to a protocol engine in the network device (100).

While FIG. 1 shows a configuration of components, other configurations may be used without departing from the scope of embodiments described herein. For example, there may be any number of rule generators. As another example, there may be any number of data repositories or processors. As another example, there may be any number of hardware components, software instances, etc. that are not shown in FIG. 1. Accordingly, embodiments disclosed herein should not be limited to the configuration of components shown in FIG. 1.

Figure 2:
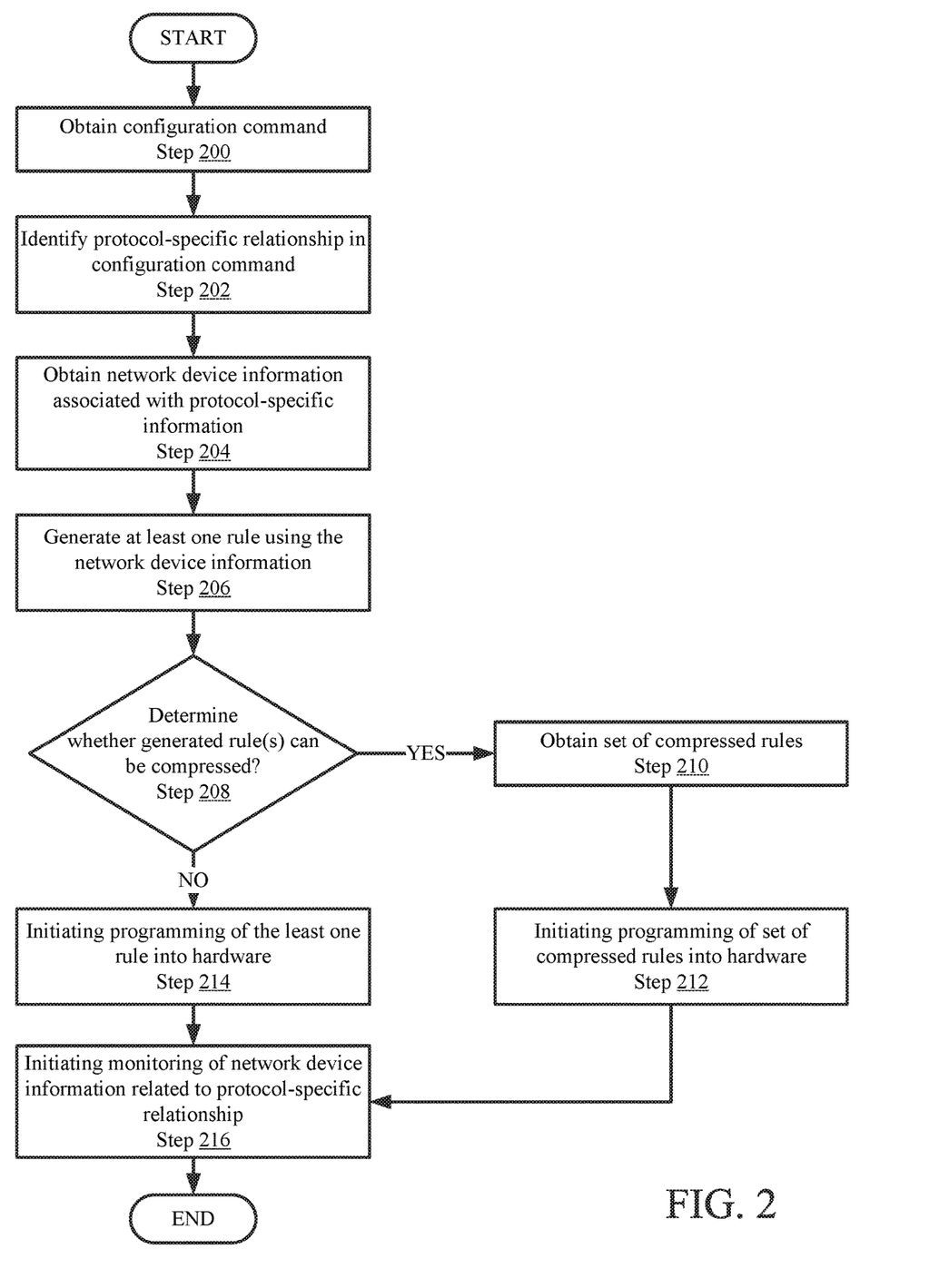
FIG. 2 shows a flowchart of a method that may be used to program a hardware component in accordance with one or more embodiments disclosed herein.

FIG. 2 shows a flowchart of a method that may be used to program a hardware component in accordance with one or more embodiments disclosed herein. The method shown in FIG. 2 may be performed by, for example, a rule generator (104, FIG. 1). Other components of the system illustrated in FIG. 1 may perform the method of FIG. 2 without departing from the invention.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 200, a configuration command is received or otherwise obtained by the rule generator. As discussed above, the configuration command may be initially obtained by the CI. Depending on the implementation of the CI, the CI may directly or indirectly provide (as discussed above) the configuration command to the rule generator. In one embodiment of the invention, only the portions of the configuration command that are relevant to the rule generator (instead of the entire configuration command) are provided to the rule generator. While the configuration command that is processed in accordance with FIG. 2 is a specific configuration command that includes a protocol-specified relationship, the CI may receive and the other components in the network device may process other types of CI commands without departing from the invention.

The configuration command is used to implement one or more traffic policies and, as such, may specify one or more of the following: (i) the name of the traffic policy that is the subject of the configuration command; (ii) the scope of the configuration command, e.g., does it apply to all management NTDUs that are received by the network device on any VRF, does it apply to management NTDUs that are received by the network device on specific VRFs, etc.; (iii) zero, one or more non-default matching rules; and (iv) one or more default matching rules. The configuration command may include additional and/or different information without departing from the invention.

The non-default matching rules may each specify: (i) the name of the matching rule; (ii) a class of network traffic e.g., IPv4, IPv6, etc.; (iii) one or more protocol-specified relationships; and (iv) zero, one, or more actions to be performed if the management NTDU matches the matching rule. The non-default rule may include additional and/or different information without departing from the invention.

The default matching rules may each specify: (i) the name of the matching rule; (ii) the type of Internet Protocol (IP) traffic, e.g., IPv4, IPv6, etc.; (iii) zero, one, or more actions to be performed if the management NTDU matches the matching rule. The default rule may include additional and/or different information without departing from the invention.

EXAMPLE 1

Configuration Command Example

The following is an example of a configuration command that is used to whitelist BGP sessions from configured BGP neighbors and to drop all other management NTDUs:
    cpu traffic-policy CPU vrf all
    traffic-policy CPU
      match BGP ipv4
        protocol neighbors bgp

```
match BGP-REST ipv4
   protocol tcp udp destination port 179
   actions
      drop
match ipv4-all-default ipv4
   actions
      drop
match ipv6-all-default ipv6
   actions
      drop
```

In this example, there are four match rules—two non-default match rules and two default match rules. The non-default match rules are BGP and BGP-REST. The default match rules are ipv4-all-default and ipv6-all-default.

End of Example

In step 202, the protocol-specified relationship(s) in the configuration command are identified. The identification may be performed by parsing the configuration command (or portions thereof) to identify the protocol-specified relationships. The rule generator may maintain a list of protocol-specified relationships, which it uses to determine whether any of the content in the configuration command is/are protocol-specified relationships. The result of step 202 is one or more identified protocol-specified relationships.

In step 204, network device information associated with the protocol-specified relationships are obtained. More specifically, for each protocol-specified relationship, network device information for the network devices defined by (or referenced by) the protocol-specified relationship is obtained from the data repository. The specific manner in which the appropriate network device information is obtained may vary based on the implementation of the invention. For example, the rule generator may maintain a data structure that specifies the location of network device information in the data repository that corresponds to the protocol-specified relationship. In another example, the rule generator may send a request to the data repository, where the request specifies the protocol-specified relationship. Upon receipt of the request, the data repository may identify the network device information corresponding to the protocol-specified relationship and then provide the network device information to the rule generator.

The network device information may include any information that is required by the rule generator to generate one or more rules based on the configuration command. The network device information may include, but is not limited to, Media Access Controller (MAC) address, IP address, IP prefix, destination port, and source port of one or more network devices.

Continuing with the Example 1 (above), the protocol-specified relationship is "protocol neighbors bgp". Thus, in this example, the network device information corresponds to the network device information for each network device that is configured to a "neighbor" (per BGP) of the network device.

In one embodiment of the invention, the obtained network device information may be all network device information for the network devices identified using the protocol-specified relationship. Alternatively, only the network device information that is required by the rule generator to generate the rules in step 206 is obtained.

In step 206, one or more rules are generated using the network device information. More specifically, the network device information in combination with the information in the configuration command is used to generate one or more rules that may be ultimately programmed into the hardware components. The rules generated in step 206 are the result of leveraging the specified protocol-specified relationship to generate an expanded set of rules without requiring the specific network device information to be included in the configuration command In one embodiment of the invention, the rule generator maintains a data structure that maps the protocol-specified relationship to a rules template(s). The rules template includes the general rule along with one or more parameter fields, where the contents of the parameter fields is the network device information. In this manner, the rule generator may maintain rule templates on a per-protocol-specified relationship basis.

Continuing with the Example 1 above, the rule generator obtains the following rules template for the protocol specific relationship—"neighbors".

EXAMPLE 2

Example Rules Template

```
match BGP_<prefix>ipv4
   source prefix <prefix>
   protocol tcp destination port 179
match BGP_<prefix>ipv4
   source prefix <prefix>
   protocol tcp source port 179
```

In this example, the "<prefix>" parameter field is completed using/32 IP prefixes obtained from the addresses of the BGP neighbors obtained in step 204. Accordingly, assume that the network device in this example is configured to have five BGP neighbors. This results in ten rules being generated to implement "match BGP ipv4 protocol neighbors bgp" (i.e., two rules per BGP neighbor—one inbound rule and one outbound rule) using the above example rule template. Thus, for each of the five BGP neighbors, the corresponding IP address is used to complete the two rules per BGP neighbor.

While this example includes an expansion of rules generated using the protocol-specified relationship, where there are two rules generated per BGP neighbor, the expansion may include any number of rules generated per BGP neighbor.

End of Example

Further, the remaining three match rules specified in the configuration command (from Example 1) result in the generation of three additional rules—one for each match rule.

In one embodiment of the invention, if the default match rules permit IPv4 and IPv6 traffic (i.e., did not specify a drop action), then no rules would be generated for such default rules. This reduces the number of rules generated in step 206 and also results in fewer rules being programmed into the hardware components.

In step 208, a determination is made about whether the rules generated in step 206 rules can be compressed. The determination is step 208 may include determining whether there are any duplicative rules generated in step 206. Further, the determination of whether the rules may be duplicated may be made on a per VRF basis. For example, rules associated with BGP neighbors that are associated with the same source port within a VRF may be deduplicated or compressed into a single rule. Other rules may be used to compress the rule generated in step 206 without departing from the invention.

In one embodiment of the invention, the determination in step 208 is not performed; rather, the rule generator always attempts to compress the rules. Given that the hardware components are a limited resource, i.e., only a finite number of rules can be programmed into the hardware components, any reduction in the number of rules to program is beneficial to the network device. Accordingly, the rule generator may always perform the analysis described in step 210.

Accordingly, if there are duplicative rules generated in step 206 or if the rule generator has a default policy of always attempting to compress the rules, the process proceeds to step 210; otherwise, the process proceeds to step 214.

In step 210, the rules generated in step 206 are compressed (or at least the rule generator attempts to compress the rules). The compression results in identifying duplicated rules and then only retaining one copy of the duplicated rules. Depending on the configuration of the network device as well as the configuration of the network in which the network device is located, step 206 may result in the generation of thousands of rules. The rule generator in step 210 is able to efficiently analyze this large set of rules to identify duplicated rules and then remove the duplicated rules from the set of rules generated in step 206. The duplication in step 210 may also include determining whether a rule generated in step 206 is a duplicate of a previously programmed rule (i.e., a rule that is already programmed in the hardware components). By analyzing the rules generated in step 206 as well as the rules that were previously programmed, the rule generator can ensure that only unique rules are programmed into the hardware components.

In step 212, the rule generator initiates the programming of the compressed set of rules into the hardware component(s). For example, the rule generator may initiate the programming of the rules into the TCAM. The initiation and ultimate programming of the rules into the hardware component(s) may be performed using any known or later discovered method without departing from the invention. The process then proceeds to step 216.

Returning to step 208, when the rules cannot be compressed, then in step 214, the rule generator initiates the programming of the set of rules into the hardware component(s). For example, the rule generator may initiate the programming of the rules into the TCAM. The initiation and ultimate programming of the rules into the hardware component(s) may be performed using any known or later discovered method without departing from the invention. The process then proceeds to step 216.

In step 216, the rule generator initiates monitoring of the network device information related to (or associated with) the protocol-specified relationship (i.e., the protocol-specified relationship in the configuration command obtained in step 200). The monitoring may include, for example, (i) initiating periodic polling of the data repository to determine whether there have been any changes to the network device information related to the protocol-specified relationship; (ii) registering with the data repository to receive notifications when there have been any changes to the network device information related to the protocol-specified relationship; or (iii) registering with the corresponding protocol engine to receive notifications when there have been any changes to the network device information related to the protocol-specified relationship. The monitoring may be implemented using other methods without departing from the invention.

After the method shown in FIG. 2 is performed, the hardware components are programmed and the NTDUs are processed, at least in part, using the programmed rules.

Referring back to Example 1, consider a scenario in which the configuration command is processed in accordance with the method shown in FIG. 2. The result of the processing is a set of 13 rules (assuming that none of the rules could be compressed) that are programmed into the hardware component(s). When an NTDU arrives, the hardware components attempt to match the NTDU to one of the programmed rules. The NTDU corresponds to an NTDU which, if not filtered out by one of the programmed rules, would be processed by the processor. Continuing with the example, the NTDU is compared to each of the rules based on the order specified in the configuration command. Thus, an attempt is initially made to match the NTDU to one of the rules corresponding to "match BGP ipv4" (i.e., to one of the ten rules generated). The NTDU matches one of these 10 rules if the NTDU is a management NTDU associated with BGP that originated from a configured BGP neighbor of the network device. If there is a match, then the NTDU is provided to the processor for processing. If there is not a match, then an attempt is made to match the NTDU to the rule corresponding to "match BGP-Rest ipv4". The NTDU matches this rule if the NTDU is a management NTDU associated with BGP that originated from a network device that was not configured as a BGP neighbor of the network device. If there is a match, then the NTDU is be dropped per the rule (i.e., actions—drop). This prevents this NTDU from being processed by the processor, thereby protecting the processor from wasting processing resources.

If there is not a match, then an attempt is made to match the NTDU to the rule corresponding to "match ipv4-all-default ipv4". The NTDU matches this rule if the NTDU is an IPv4 packet. If there is a match, then the NTDU is dropped per the rule (i.e., actions—drop). This prevents this NTDU from being processed by the processor, thereby protecting the processor from wasting processing resources.

If there is not a match, then an attempt is made to match the NTDU to the rule corresponding to "match ipv6-all-default ipv6". The NTDU matches this rule if the NTDU is an IP v6 packet. If there is a match, then the NTDU is dropped per the rule (i.e., actions—drop). This prevents this NTDU from being processed by the processor, thereby protecting the processor from wasting processing resources.

As discussed above, the protocol engines use the management NTDUs to manage the network device. In particular, the protocol engines process the management NTDUs, where the result of the processing may include updating the network device information in the data repository. The changes to the network device information may trigger the generation and programming of new rules and/or the removal of existing rules. The process of updating the programmed rules with new rules and/or by removing existing rules is described below in FIG. 3. By using the method shown in FIG. 3, the intent of the configuration command may be realized without the need for the user to take any additional actions.

For example, assume that a user initially provided the configuration command shown in Example 1. The intent of the user is to ensure that only NTDUs from configured BGP neighbors are processed by the processor of the network device. However, if the BGP neighbors change over time, e.g., based on a user changing the BGP configuration or a configured BGP peer becomes inactive, then the currently programmed rules (which were based on the set of initially configured BGP neighbors) are no longer accurate. Thus, the user's intent to ensure that only NTDUs from configured BGP neighbors are processed by the processor of the network device is no longer being achieved. Embodiments of the invention, e.g., using the method shown in FIG. 3, enable the network device to track changes to network device information and automatically trigger the updating of programmed rules based on this updated network device information.

Figure 3:
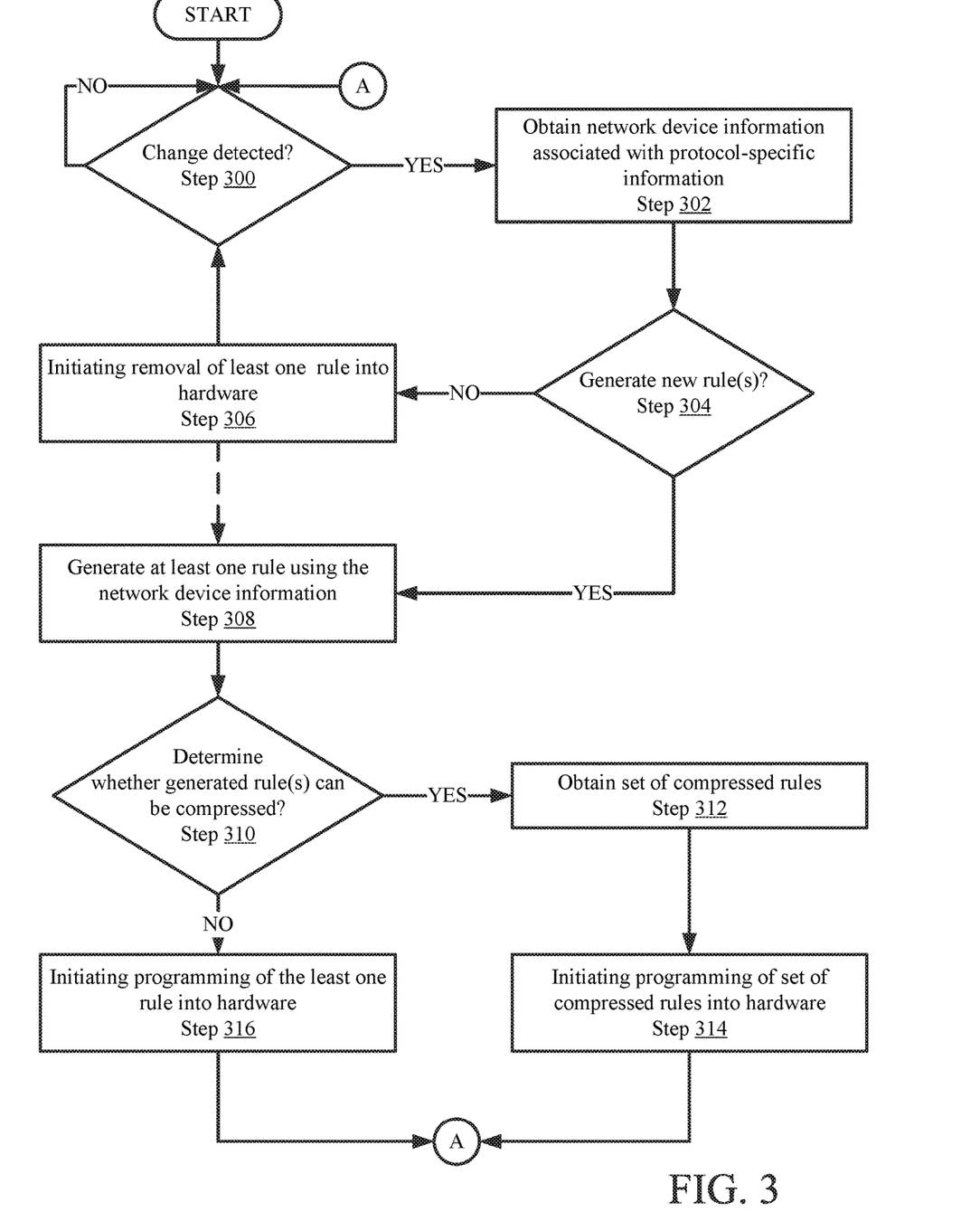
FIG. 3 shows a flowchart of a method that may be used to program a hardware component in accordance with one or more embodiments disclosed herein.

FIG. 3 shows a flowchart of a method that may be used to program a hardware component in accordance with one or more embodiments disclosed herein. The method shown in FIG. 3 may be performed by, for example, a rule generator (104, FIG. 1). Other components of the system illustrated in FIG. 1 may perform the method of FIG. 3 without departing from the invention.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 300, a determination is made about whether a change to network device information associated with a protocol-specific relationship has occurred. The change may be detected in response to the monitoring that was initiated in step 216. For example, the rule generator may detect a change in response to its periodic polling of the data repository. In another example, the rule generator may receive a notification from the data repository and/or a protocol engine of a change to the network device information related to a protocol-specified relationship. If a change is detected, the process proceeds to step 302; otherwise, the monitoring continues.

In step 302, the network device information associated with the protocol-specified relationships are obtained. The network device information may be obtained in the same or substantially the same manner as described in step 204. The network device information obtained in step 302 may correspond to all the network device information associated with the protocol-specified relationship.

However, in another embodiment of the invention, the network device information that is obtained in step 302 may be limited to the network device information related to the change that triggered the detection in step 300. For example, if the change detected in step 300 was due to the addition of network device information, then only the additional network device information is provided. However, if the change detected in step 300 was due to the removal of network device information, then the network device information in step 302 may specify the network device information that was removed. The network device information obtained in step 302 may include a combination of additional network device information and network device information that was removed.

In step 304, a determination is made about whether the network device information obtained in step 302 requires the generation of a rule(s) or if the network device information obtained in step 302 requires the removal of a rule(s). If the network device information obtained in step 302 requires the generation of a rule(s), the process proceeds to step 308; otherwise, the process proceeds to step 306.

In step 306, one or more rules to remove from the hardware component(s) are identified and the removal of the rule(s) is initiated. The identification of the rule(s) to remove may include using the network device information obtained in step 302 to identify the rule(s) that need to be removed. For example, if the network device information specifies an IP prefix, then the currently programmed rules may be analyzed to identify which rules specify the IP prefix. These identified rules are then removed from the hardware component(s). Other methods may be used to identifying rules to remove without departing from the invention. The process may then proceed to step 300; alternatively, if the network device information obtained in step 302 requires both the removal of a rule(s) and the generation of a rule(s), the process proceeds to step 308.

In step 308, one or more rules are generated using the network device information obtained in step 302. More specifically, the network device information in combination with the information in the rules template associated with the protocol-specified relationship is used to generate one or more rules that may ultimately be programmed into the hardware components. The generation of one or more rules may be performed in the same or substantially the same manner as in step 206.

In step 310, a determination is made about whether the generated in step 308 rules can be compressed. The determination may be performed in the same or substantially the same manner as in step 208. Accordingly, if there are duplicative rules generated in step 308 or if the rule generator has a default policy of always attempting to compress the rules, the process proceeds to step 312; otherwise, the process proceeds to step 316.

In step 312, the rules generated in step 308 are compressed. The compression of rules may be performed in the same or substantially the same manner as in step 210.

In step 314, the rule generator initiates the programming of the compressed set of rules into the hardware component(s). The programming of the compressed rules may be performed in the same or substantially the same manner as in step 212. The process then proceeds to step 300.

In step 316, returning to step 310, when the rules cannot be compressed, then in step 314, the rule generator initiates the programming of the set of rules into the hardware component(s). The programming of the rules may be performed in the same or substantially the same manner as in step 214. The process then proceeds to step 300.

In another embodiment of the invention, each time a change to network device information associated with a protocol-specific relationship is detected in step 300, steps 204, 206, 208, and 214 (or steps 210-212) are performed. Thus, in this embodiment of the invention, a new set of rules is generated, which may include one or more rules that were previously programmed into the hardware. Further, all of the previously generated rules (i.e., the rules generated in accordance with FIG. 2 or FIG. 3) are removed from the hardware (e.g., in the TCAM) and the newly generated set of rules is programmed into the hardware. Depending on the implementation of the invention, the previously generated rules may be removed from the hardware and the newly generated may then be added to the hardware. Alternatively, the programming of the newly generated rules into the hardware may be achieved by overwriting the previously generated rules with the newly generated rules. The invention is not limited to the aforementioned embodiments.

As articulated above, specific embodiments are described with reference to the accompanying figures. In the preceding description, numerous details were set forth as examples. One of ordinary skill in the art, having the benefit of this detailed description, would appreciate that one or more embodiments described above may be practiced without the explicitly articulated details, and that numerous variations or modifications may be possible without departing from the scope. Certain details known to those of ordinary skill in the art may be omitted to avoid obscuring the description.

In the preceding description of the figures, any component described with regard to a figure, in various embodiments, may be equivalent to one or more like-named components shown and/or described with regard to any other figure. For brevity, descriptions of these components were not repeated with regard to each figure. Thus, each and every embodiment of the components of each figure is incorporated by reference and assumed to be optionally present within every other figure having one or more like-named components. Additionally, in accordance with various embodiments, any description of any component of a figure is to be interpreted as an optional embodiment, which may be implemented in addition to, in conjunction with, or in place of the embodiments described with regard to a corresponding like-named component in any other figure.

Throughout this application, ordinal numbers (e.g., first, second, third, etc.)

may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

While embodiments described herein have been described with respect to a limited number of embodiments, those skilled in the art, having the benefit of this disclosure, will appreciate that other embodiments can be devised which do not depart from the scope of embodiments described herein as disclosed herein. Accordingly, the scope of embodiments described herein should be limited only by the attached claims.

What is claimed is:

1. A method for reducing overhead in configuring a network device that is operatively coupled for communication to a plurality of other network devices, wherein the network device and the plurality of other network devices all execute a protocol, the method comprising:
   obtaining, by the network device, a configuration command comprising a protocol-specified relationship defined by the protocol, wherein the protocol-specified relationship defines a relationship between the network device and at least one of the other plurality of network devices;
   obtaining, using the protocol-specified relationship, network device information from a data repository on the network device;
   obtaining a rules template associated with the protocol-specified relationship;
   generating, by the network device, a plurality of rules based on the rules template and on the network device information; and
   programming the network device using the plurality of rules.

2. The method of claim 1, further comprising:
   in response to detecting a change in the network device information that is stored in the data repository and that is associated with the protocol-specified relationship:
      obtaining updated network device information from the data repository;
      generating, by the network device, a second plurality of rules based, at least in part, on the updated network device information; and
      programming the network device using the second plurality of rules.

3. The method of claim 2, further comprising:
   prior to detecting the change, initiating monitoring for changes to the network device information associated with the protocol-specified relationship.

4. The method of claim 1, wherein the protocol-specified relationship is a Border Gateway Protocol (BGP) neighbor.

5. The method of claim 1, wherein programming the network device using the plurality of rules comprises:
   removing a duplicative rule from the plurality of rules to obtain a compressed plurality of rules; and
   programming the network device using the compressed plurality of rules.

6. The method of claim 1, wherein the configuration command specifies that the plurality of rules applies to all virtual routing and forwarding (VRF) functions on the network device.

7. A network device operatively coupled for communication to a plurality of other network devices, wherein the network device and the plurality of other network devices all execute a protocol, the network device comprising:
   a processor;
   a data repository comprising network device information;
   a hardware component; and
   a rule generator, which when executed by the processor, is configured to:
      obtain a configuration command comprising a protocol-specified relationship defined by the protocol, wherein the protocol-specified relationship defines a relationship between the network device and at least one of the other plurality of network devices;
      obtain, using the protocol-specified relationship, the network device information from the data repository;
      obtain a rules template associated with the protocol-specified relationship;
      generate a plurality of rules based on the rules template and on the network device information; and
      program the hardware component using the plurality of rules.

8. The network device of claim 7, wherein the rule generator, which when executed by the processor, is further configured to:
   in response to detecting a change in the network device information associated with the protocol-specified relationship that is stored in the data repository:
      obtain updated network device information from the data repository;
      generate a second plurality of rules based, at least in part, on the updated network device information; and
      program the hardware component using the second plurality of rules.

9. The network device of claim 8, wherein the rule generator, which when executed by the processor, is further configured to:

prior to detecting the change, initiate monitoring for changes to the network device information associated with the protocol-specified relationship.

10. The network device of claim 7, wherein the hardware component is a ternary content-addressable memory (TCAM).

11. The network device of claim 7, wherein programming the network device using the plurality of rules comprises:
    removing a duplicative rule from the plurality of rules to obtain a compressed plurality of rules; and
    programming the network device using the compressed plurality of rules.

12. The network device of claim 7, wherein the configuration command specifies that the plurality of rules applies to all virtual routing and forwarding (VRF) functions on the network device.

13. The network device of claim 7, wherein the protocol-specified relationship is a Border Gateway Protocol (BGP) neighbor.

14. A method for managing a network device, comprising:
    obtaining a configuration command comprising a protocol-specified relationship;
    obtaining, using the protocol-specified relationship, network device information;
    generating a plurality of rules based, at least in part, on the network device information;
    programming the network device using the plurality of rules;
    in response to detecting a change in the network device information associated with the protocol-specified relationship:
        obtaining updated network device information;
        generating a second plurality of rules based, at least in part, on the updated network device information; and
        programming the network device using the second plurality of rules.

15. The method of claim 14, the method further comprising:
    prior to detecting the change, initiating monitoring for changes to the network device information associated with the protocol-specified relationship.

16. The method of claim 14, wherein programming the network device using the plurality of rules comprises:
    removing a duplicative rule from the plurality of rules to obtain a compressed plurality of rules; and
    programming the network device using the compressed plurality of rules.

17. The method of claim 14, wherein the configuration command specifies that the plurality of rules applies to all virtual routing and forwarding (VRF) functions on the network device.

18. The method of claim 14, wherein the protocol-specified relationship is a Border Gateway Protocol (BGP) neighbor.

19. The method of claim 14, wherein generating the plurality of rules comprises obtaining a rules template associated with the protocol-specified relationship.

* * * * *